July 16, 1968     T. H. COURTENAY ET AL     3,393,307
ELECTRONIC MULTIPLIER/DIVIDER Filed Dec. 30, 1965     3 Sheets-Sheet 1

United States Patent Office 3,393,307
Patented July 16, 1968

3,393,307
ELECTRONIC MULTIPLIER/DIVIDER
Terence Henry Courtenay and Alphonse Antoine Jacques Gilbert, Ste.-Foy, Quebec, Canada, and Joseph Alexandre Jacques Beaulieu, London, England, assignors to Canadian Patents and Development Limited, Ottawa, Ontario, Canada
Filed Dec. 30, 1963, Ser. No. 338,552
Claims priority, application Canada, Dec. 31, 1962, 865,561
6 Claims. (Cl. 235—195)

ABSTRACT OF THE DISCLOSURE

A system for multiplying or dividing voltages including a modulator continuously amplitude modulating a reference signal with a first voltage, a coincidence circuit receiving the reference signal and second voltage and producing a pulse upon coincidence in the magnitudes thereof, a sampling circuit receiving the outputs from the modulator and coincidence circuit and developing an output with peak value proportional to the multiplied value of the first and second voltages, and an integrator for producing an output signal corresponding to said multiplied value.

---

This invention relates to a method and apparatus for obtaining continuously a voltage which is proportional to the product or to the ratio of two voltages subject to rapid variation and change of polarity.

The invention although applicable to many types of simulator and analogue computer was developed for a simulator designed to study the dynamic behaviour of radar guided missiles. When a target aircraft is illuminated by electromagnetic radiation from a radar transmitter different portions of the surface of the aircraft reflect the radiation to differing degrees depending on the area and orientation of the particular reflecting surface relative to the incident radiation. As a consequence the target appears to the radar receiver to be composed of a number of discrete sources whose intensity varies with the aspect of the aircraft. The aspect of the aircraft relative to the radar changes continually during the time that it is engaged by a guided missile and as a consequence the radar does not point continuously at one particular point on the aircraft. In the dynamic situation errors may be induced in the pointing angle of the radar which exceed the angle subtended by the aircraft at the radar. Under these circumstances angular noise is introduced into the guidance feedback loops of the missile and a successful interception may not be achieved. In order to study the dynamic effects of angular noise on missile guidance systems an analogue simulation is required. Existing analogue computers can be used for only a part of this simulation because of limitations in the speed of their response if excessive time scaling is to be avoided. One of the important operations required in such a simulator is that of multiplication and division of voltages representing various functions. Hitherto these operations have been accomplished by means of a variety of different arrangements including those utilizing thermionic or semiconductor devices with square or logarithmic characteristics; those employing simultaneous pulse width and amplitude modulation techniques; those utilizing tubes having specially designed electrodes; by means of circuits based on the carrier multiplier and the Hall multiplier effects; and other less widely adopted techniques. None of the prior art techniques however was found suitable for the particular application with which the present invention is concerned, some of these prior art systems being limited in speed of operation whilst others are restricted in the polarities of input and output voltages and in their accuracy.

The present invention has for an object to provide a method and apparatus for producing a substantially continuous output voltage proportional to the product of or ratio of two input voltages which may be subject to rapid variation and change of polarity. The invention by using sinusoidal signals allows narrow band operation and facilitates rejection of error caused by distortion of signals.

In accordance with the present invention a method of multiplying and dividing voltages representing various functions comprises the steps of modulating a reference carrier voltage with one of said voltages and applying said modulated carrier voltage to a sampling circuit, comparing the other voltage with said reference carrier voltage and producing a pulse whenever said two voltages are of equal magnitude, applying said pulse to said sampling circuit to operate said sampling circuit, the output of said sampling circuit being proportional to the product of said two voltages, and applying the output of said sampling circuit to an integrating circuit thereby to produce a substantially continuous output voltage equal to the peak value of the sampled voltage.

Apparatus for carrying out the method of the present invention comprises means for generating a sinusoidal reference carrier wave, means for modulating said reference carrier wave with one of the voltages to be multiplied, means for comparing the other of said voltages with said reference carrier wave to produce a pulse once for each cycle of said carrier wave at the instant in each cycle when said reference carrier wave passes in one direction through the value of the second of said voltages to be multiplied, a sampling circuit operable by said pulse, said modulated reference carrier wave being applied to said sampling circuit to operate the latter, said sampling circuit when operated by said pulse adapted to sample said carrier wave and to deliver an output voltage proportional to the product of said two voltages, and means adapted to stretch said sample output voltage in time to provide a substantially continuous output voltage equal to the peak value of said sample output voltage.

Other features which may be included in accordance with the invention will be described hereinafter and referred to in the appended claims.

The invention will now be more particularly described in connection with the accompanying drawings which show by way of example an embodiment of the invention, and in which.

Figure 1:
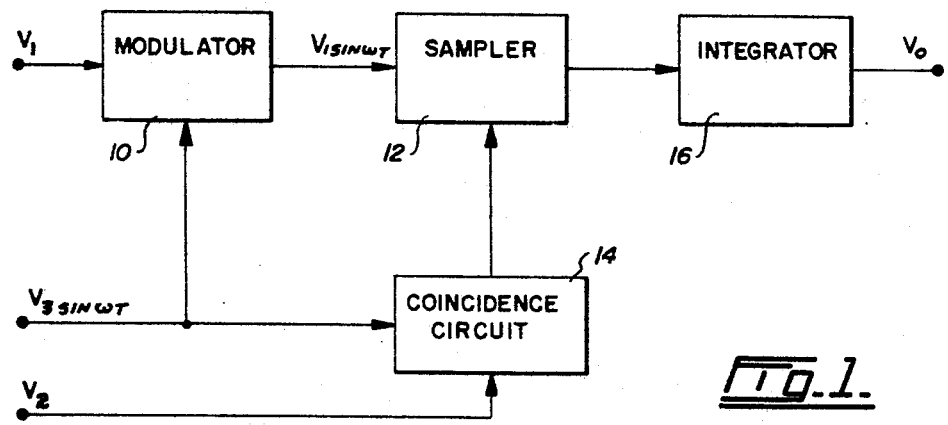
FIGURE 1 is a block schematic diagram showing the principle of operation of the present invention.

The basic operations according to the method of the present invention for effecting multiplication or division of two voltages V1 and V2, due regard being paid to sign, are shown in the schematic diagram of FIGURE 1. Referring to FIGURE 1 a reference carrier V3 sin $\omega t$ is modulated by the input voltage V1 in the modulator unit 10. The modulated signal output of modulator unit 10 may be expressed as V1 sin $\omega t$ where $\omega$ is the angular frequency of the carrier V3 sin $\omega t$. The voltage V2 and the reference carrier V3 sin $\omega t$ are applied to a coincidence circuit 14 which produces a pulse once per cycle of the carrier at the instant when V3 sin $\omega t$ passes in one direction through the value of V2.

The pulse produced by the coincidence circuit 14 is applied to a sampling circuit 12 and samples the voltage V1 sin ωt at the instant when V3 sin ωt=V2 or when $$\sin \omega t = \frac{V2}{V3}$$

The value of V1 sin ωt at this instant is $$V1\left(\frac{V2}{V3}\right)$$

This voltage sample is stretched in time by means of an integrator 16 so that a continuous output voltage $V_0$ is produced equal to the peak value of the sample voltage, that is $$V_0 = \frac{V1\ V2}{V3}$$

This relationship holds for positive and negative polarities of the voltages concerned and is subject only to the restriction that |V2| is less than |V3|, in order that the sampling pulse shall be produced. Thus the output voltage $V_0$ is proportioned to the product V1 and V with due regard to sign and the constant of proportionality may be adjusted by altering V3 or the gain of the modulator unit 10.

Figure 2:
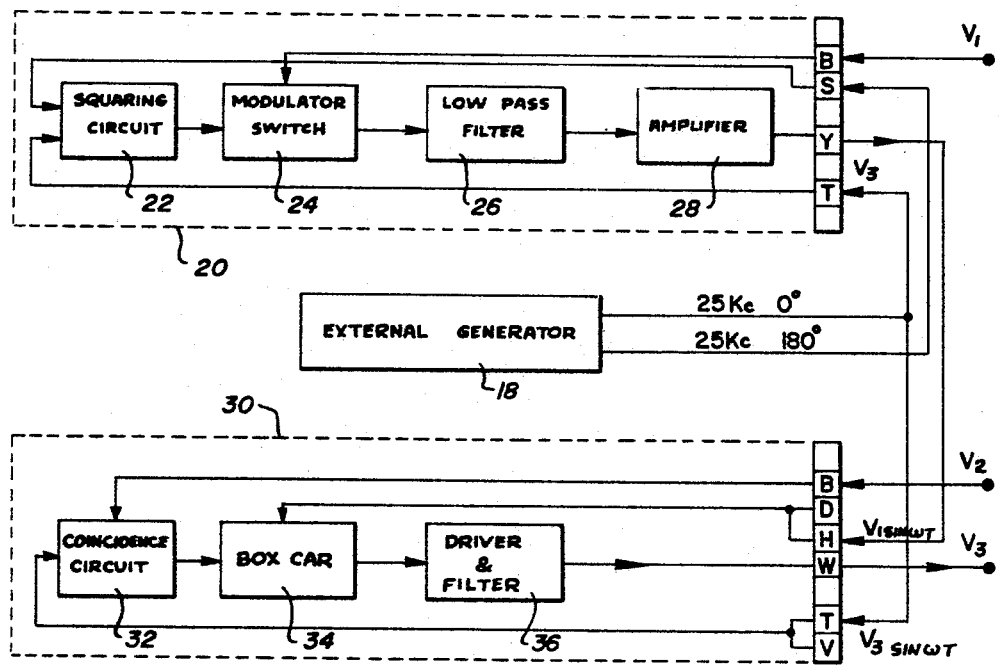
FIGURE 2 is a block diagram showing the main functional units of one embodiment of the invention.
Figure 3:
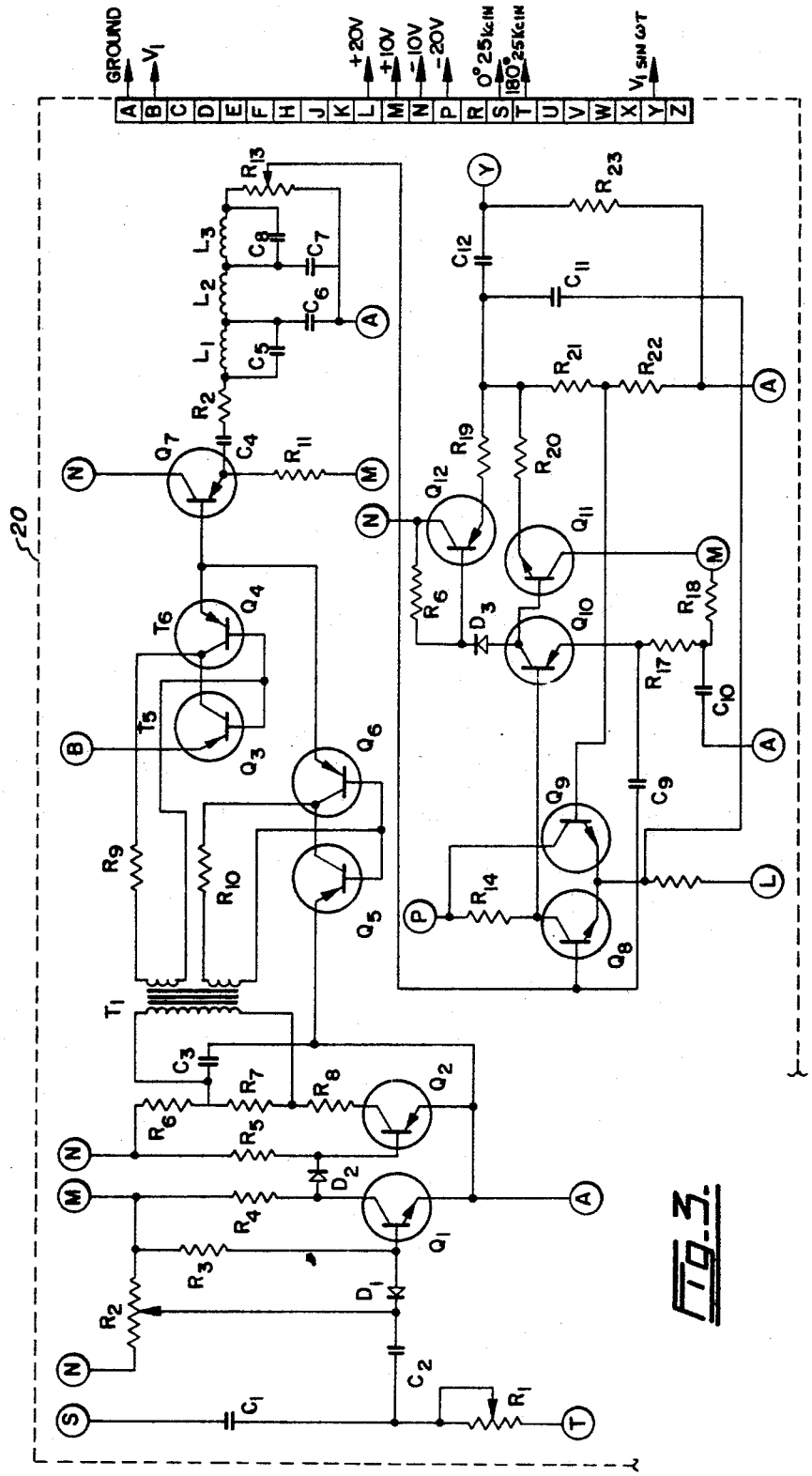
FIGURE 3 is a circuit diagram showing the configuration of the modulator unit of FIGURE 2.
Figure 4:
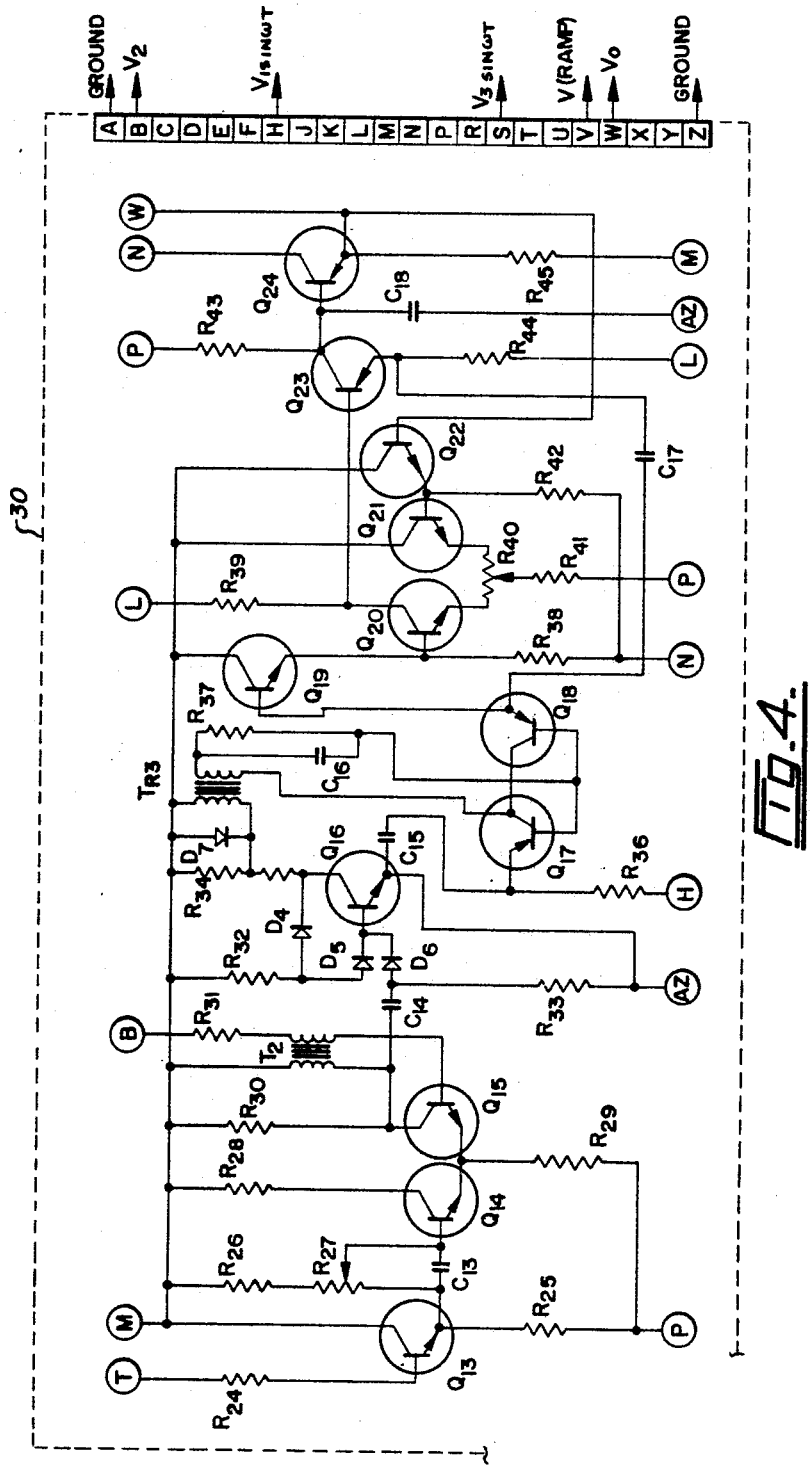
FIGURE 4 is a circuit diagram showing the configuration of the sampling unit of FIGURE 2.

A circuit arrangement of a multiplier operating on the foregoing principle is shown in FIGURES 2, 3 and 4 of the accompanying drawings. FIGURE 2 shows in block diagram form the major functional units employed in this multiplier. The external generator 18 produces 25 kilocyle 0° and 180° reference carrier waves which are fed to a modulator unit generally designated 20 and also to a sampling unit generally designated 30.

The purpose of the modulator unit 20 is to modulate the 25 kc. carrier wave with an input signal V1 containing a d.c. component. The 0° and 180° reference carrier waves are applied via terminals T and S respectively to a squaring circuit 22 which produces a 50—50 square wave output for operation of the modulator switch 24. One of the two voltages to be multiplied, V1, is applied via terminal B to modulator switch 24 to modulate the carrier wave and the output of switch 24 is fed to a low pass filter circuit 26 which removes the d.c. component and the higher harmonics to produce a 25 kilocycle signal having a modulation envelope of the same form as the input signal V1. After amplification in amplifier 28 the A.C. output is applied via terminals Y and H to the sampling unit 30.

The sampling unit 30 is operable to sample the output signal V1 sin ωt from the modulator unit 20 at a time when the reference carrier V3 sin ωt is equal in magnitude to the second of the two voltages to be muliplied V2. The input voltage V2 is applied to terminal B of the sampling unit and is compared with the reference carrier V3 sin ωt which is applied to terminal R of the sampling unit. The sampling unit is operable to produce a pulse at the instant when the carrier V3 sin ωt passes through the value V2 in a positive-going direction. This pulse is used to control a switching circuit to one input of which at terminal H is applied the modulated signal V1 sin ωt from the modulator unit. The voltage V1 sin ωt is thus sampled at the instant of production of the pulse and this voltage sample is subsequently stretched in time, without changing its amplitude, and amplified in the integrator circuit 34 to produce a continuous output voltage proportional to $$\frac{V1\ V2}{V3}$$

The circuit configuration of the multiplier is shown in FIGURES 3 and 4, FIGURE 3 illustrating the circuit of the modulator unit and FIGURE 4 illustrating the circuit of the sampling unit.

Referring to FIGURE 3 the modulator unit 20, as has been stated, is operable to modulate the 25 kilocycle input carrier wave with an input signal V1 containing a D.C. component and representing one of the two voltages to be multiplied, said input signal being applied thereto at the terminal B. The capacitor C1 and variable resistor R1 network connected between terminals S and T provides a means for adjusting the phase of the carrier before modulation so that the final modulated carrier wave is in the same phase as the 0° reference carrier. The 0° 25 kilocycle carrier wave is applied to input terminal T and the 180° 25 kilocycle reference carrier wave is applied to input terminal S. The input carrier waves are applied via capacitor C2 and diode D1 to the base of transistor Q1 which latter forms, with transistor Q2, a squaring circuit operable to produce a 50—50 square wave output. The square wave output from the squaring circuit is coupled by means of transformer T1 to each of two transistor on-off switches comprising transistors Q3 and Q4, and Q5 and Q6 respectively. One of the on-off switches, that comprising Q3 and Q4, is connected between terminal B and the base of an emitter follower stage Q7 while the other switch is connected between the base of Q7 and ground. The input voltage V1 is applied at terminal B to the emitter of Q3. The on-off switches are driven in antiphase whereby during odd half-cycles of the carrier the base of Q7 is grounded and during even half-cycles of the reference carrier the base of Q7 is at the voltage appearing at terminal B, i.e. at the voltage V1. The output of the emitter follower stage Q7 is applied to a low pass filter circuit comprising a pair of shunt-derived m-type half sections L1, C5 and C6 and L3, C8 and C7 respectively and the inductance L2. The filter circuit is effective to remove the D.C. component of the modulated carrier and the higher harmonics thereof. The output of the filter circuit is thus a 25 kilocycle signal having a modulation envelope of the same form as the variation in the input voltage V1 and this signal is applied to the input of an A.C. feed-back amplifier. The latter amplifier comprises the five transistors, Q8, Q9, Q10, Q11 and Q12, and is effective to compensate for the attenuation produced in the associated modulator switching circuit and the associated filter circuit. The level of the output signal V1 sin ωt appearing at output terminal Y of the amplifier may be adjusted by means of the potentiometer R13.

The circuit of the sampling unit 30 is shown in FIGURE 4. The purpose of this sampling unit is to sample the output signal V1 sin ωt from the modulator unit at a time $t$ when the reference carrier V3 sin ωt=V2, V2 being the second of the two input voltages to be multiplied. The reference carrier V3 sin ωt is applied to terminal T and thence via resistor R24 to the base of an emitter follower stage Q13. The output from this emitter follower is coupled by capacitor C13 to the base of transistor Q14 which with transistor Q15 forms a trigger circuit. The input voltage V2 is applied to terminal B and thence via resistor R31 and the secondary winding of transformer T2 to the base of transistor Q15. Trigger action is achieved by positive feed-back from the collector to the base of Q15 via resistors R30 and R31 and the secondary winding of transformer T2. The circuit is triggered at the instant when the reference carrier V3 sin ωt applied via the emitter follower Q13 to the base of Q14 passes through V2 in a positive-going direction at which time a 1 microsecond sampling pulse is produced at the collector of Q15. This sampling pulse is applied via capacitor C14 to a pulse shaper and amplifier stage Q16 and thence via the transformer T3 to the input of a box car circuit. The box car circuit comprises a double transistor series switch comprising transistors Q17 and Q18, capacitor C17, an integrator amplifier which comprises transistors Q19, Q20, Q21 and Q22, and a low-pass amplifier comprising transistors Q23 and Q24.

The function to be sampled, in this case the output V1 sin ωt from the modulator unit 20, is applied to terminal H and thence via resistor R36 to the input of the series switch circuit Q17, Q18. The series switch Q17, Q18 is similar to modulator switches Q3, Q4 and Q5, Q6. Diode D7 prevents pulses of negative polarity from reaching switch Q17, Q18. The charging circuit R37, C16 holds the switch "off" during the interpulse period. The series switch is thus normally held in the "off" condition but is turned "on" at the instant of production of the microsecond sampling pulse thereby to produce a voltage sample which is applied to the input of the integrator amplifier circuit. The integrator amplifier circuit is adapted to stretch the voltage sample in time without changing its amplitude thereby to provide a continuous output voltage $V_0$ proportional to $$\frac{V1\ V2}{V3}$$

The integrator amplifier circuit is of the differential type and employs four transistors to reduce the biasing current demand while increasing the D.C. stability. The A.C. feedback applied to capacitor C17 increases its effective value by a factor approximately equal to the gain of the amplifier, such that the charge on the capacitor is held constant during the interval between pulses. The signal at the collector of Q20 is amplified by Q23 and Q24 and fed back to the base of Q22. Capacitor C18 cuts off the high frequency harmonics due to the step operation of the box car circuit and produces a smooth output voltage. The closed loop gain at low frequency (0–500 c.p.s.) is equal to unity because of the feedback to the base of Q22.

The multiplier unit of FIGURES 2 to 4 thus produces a continuous output voltage $V_0$ which is proportional to the product of the two voltages V1 and V2 required to be multiplied with due regard to sign and the constant of proportionality may be adjusted by altering voltage V3 or the gain of the modulator unit 20.

We claim:

1. Apparatus for multiplying voltages representing various functions comprising means for generating a continuous sinusoidal reference carrier wave; means for continuously amplitude modulating said reference carrier wave with one of the voltages to be multiplied; means for comparing the other of said voltages with said reference carrier wave to produce a pulse once for each cycle of said carrier wave at the instant in each cycle when said reference carrier wave passes in one direction through the value of the other of said voltages to be multiplied; a sampling circuit operable by said continuous amplitude pulse, said modulated reference carrier wave being applied to said sampling circuit to operate the latter, said sampling circuit when operated by said pulse sampling said carrier wave and to delivering an output voltage proportional to the product of said two voltages; and means for stretching said sample output voltage in time to provide a substantially continuous output voltage equal to the peak value of said sample output voltage.

2. Apparatus for multiplying voltages representing various functions comprising means for generating a continuous sinusoidal reference carrier wave; means for continuously modulating said reference carrier wave with one of the voltages to be multiplied; means for comparing the other of the voltages to be multiplied with said reference carrier wave to produce a pulse at the instant in each cycle of said carrier wave when it passes in one direction through the value of said other voltage; and means controlled by said pulse for sampling said modulated carrier wave at said instant to produce an output voltage sample proportional to the product of the two voltages to be multiplied.

3. Apparatus as claimed in claim 2 including means for stretching said output voltage sample in time without changing its amplitude thereby to provide a continuous output voltage proportional to the peak value of the sampled voltage.

4. Apparatus as claimed in claim 2 wherein said comparison means comprises a coincidence circuit, said coincidence circuit including a transistor trigger circuit, said reference carrier wave and said second voltage applied to different inputs of said trigger circuit, said trigger circuit for delivering a pulse at the instant when said reference carrier wave passes through the value of said second voltage in a positive going direction, and means for shaping and amplifying said pulse.

5. Apparatus as claimed in claim 2 wherein said sampling means comprises a double transistor switch circuit controlled by said output pulse, said modulated carrier being applied to one input of said switch, said switch operable by said pulse for sampling said modulated carrier wave and to deliver an output voltage representing the value of said reference carrier wave at the instant of production of said pulse.

6. Apparatus for multiplying voltages representing various functions comprising means for generating a continuous sinusoidal reference carrier wave, means for continuously amplitude modulating said reference carrier wave with one of the voltages to be multiplied, means for comparing the other of the voltages to be multiplied with said reference carrier wave to produce a pulse at the instant in each cycle of said carrier when it passes in one direction through the value of said other voltage, and a box car circuit including a double transistor series switch controlled by said pulse for sampling said modulated carrier wave at said instant to produce an output voltage sample and an integrator amplifier circuit for stretching said voltage sample in time without changing its amplitude, thereby to provide a continuous output voltage proportional to the product of the two voltages to be multiplied.

References Cited

UNITED STATES PATENTS

| 2,773,641 | 12/1956 | Baum. | |
|---|---|---|---|
| 2,839,244 | 6/1958 | McCoy et al. | 235—195 |
| 2,966,306 | 12/1960 | Isabeau | 235—194 |
| 2,969,915 | 1/1961 | Collier et al. | 235—194 |
| 3,043,516 | 7/1962 | Abbott et al. | 235—195 |
| 3,057,555 | 10/1962 | Case | 235—195 |

MALCOLM A. MORRISON, *Primary Examiner.*

J. RUGGIERO, *Assistant Examiner.*